United States Patent [19]

Appel et al.

[11] Patent Number: 5,550,668
[45] Date of Patent: Aug. 27, 1996

[54] MULTISPOT POLYGON ROS WITH MAXIMIZED LINE SEPARATION DEPTH OF FOCUS

[75] Inventors: James J. Appel, Rochester; Susan E. Dunn, Mohegan Lake, both of N.Y.

[73] Assignee: Xerox Corporation, Stamford, Conn.

[21] Appl. No.: 342,974

[22] Filed: Nov. 21, 1994

[51] Int. Cl.$^6$ ............................................. G02B 26/08
[52] U.S. Cl. ........................... 359/204; 359/206; 359/207; 359/212; 347/233; 347/244
[58] Field of Search .................................. 359/204, 205, 359/206, 207, 652, 653, 654, 216, 217, 218; 250/578.1, 234, 235, 236; 347/225, 233, 241, 243, 244

[56] References Cited

U.S. PATENT DOCUMENTS

| | | | |
|---|---|---|---|
| 3,750,189 | 7/1973 | Fleischer | 347/137 |
| 4,253,102 | 2/1981 | Kataoka et al. | 347/234 |
| 4,390,235 | 6/1983 | Minoura | 359/204 |
| 4,404,571 | 9/1983 | Kitamura | 359/204 |
| 4,474,422 | 10/1984 | Kitamura | 359/204 |
| 4,796,964 | 1/1989 | Connell et al. | 359/204 |
| 4,962,983 | 10/1990 | Watanabe et al. | 359/204 |
| 5,179,465 | 1/1993 | Kondo | 359/218 |
| 5,202,784 | 4/1993 | Reddersen | 359/196 |
| 5,245,462 | 9/1993 | Kanai et al. | 359/204 |
| 5,270,851 | 12/1993 | Makino et al. | 359/206 |
| 5,300,962 | 4/1994 | Genovese | 347/135 |
| 5,329,399 | 7/1994 | Ho | 359/662 |
| 5,373,395 | 12/1994 | Adachi | 359/652 |

FOREIGN PATENT DOCUMENTS 4-283717  10/1992  Japan .

OTHER PUBLICATIONS

"Self–Focusing ROS," Xerox Disclosure Journal, vol. 18, No. 2, (Mar./Apr. 1993), pp. 151–152.

*Primary Examiner*—Paul M. Dzierzynski
*Assistant Examiner*—Darren E. Schuberg
*Attorney, Agent, or Firm*—Duane C. Basch

[57] ABSTRACT

The present invention is a method and apparatus for improving the depth of focus in a raster output scanner (ROS), and more particularly to a system for maximizing the line separation depth of focus of a multispot ROS while maintaining the system common depth of focus. In a preferred design for a ROS-based system, the system common depth of focus (system common DOF) is maximized, where the system common DOF is characterized as the depth-of-focus over which all performance parameters are met. More specifically, the performance parameters are intended to include the following five factors: (1) scan and cross-scan spot size; (2) wobble; (3) differential bow; (4) line separation; and (5) scan linearity. Maximizing the system common DOF means to maximize the depth-of-focus while at all times meeting or exceeding the performance requirements for the five listed parameters. The optical system design achieves a desirable system common DOF while maintaining a line separation of 127 μm (1/200 inch).

23 Claims, 10 Drawing Sheets

MULTISPOT POLYGON ROS WITH MAXIMIZED LINE SEPARATION DEPTH OF FOCUS

This invention relates generally to a method and apparatus for improving the depth of focus in a raster output scanner (ROS), and more particularly to a system for maximizing the line separation of a multispot ROS while maintaining a substantial system common depth of focus.

CROSS REFERENCE

The following related application is hereby incorporated by reference for its teachings:

"Multiple Beam Raster Output Scanner Optical System Having Telecentric Chief Rays," T. Fisli et al., application Ser. No. 08/174,917, filed Dec.29, 1993.

BACKGROUND AND SUMMARY OF THE INVENTION

The present invention is employed in a rotating polygon-based optical system. A known rotating polygon multi-beam ROS scanner system is described below, for easier understanding of the technical discussion, in Prior Art FIG. 10. It should be appreciated that the functions described below equally apply to many polygon-based systems, independently of the number of light sources used.

FIG. 10 shows a pair of sagittally offset laser diodes 31 and 32. The beams 41 and 42 emitted by laser diodes 31 and 32 are collimated by collimator 33 (lens L1). A sagittal aperture 34 follows the collimator to control the F/#, which in turn controls the spot size created by the beams. The input cylinder optical element 35 (lens L2) focuses the beams 41 and 42 on the surface of a polygon facet 36 of the rotating polygon. After reflecting from facet 36, beams 41 and 42 pass through the f-Θ (f-theta) lens 37 (lens L3). The main function of the f-Θ lens 37 is to provide focusing in the tangential meridian and control the scan linearity, in terms of uniform spot displacement per unit angle of polygon rotation.

Subsequently, the motion compensating optical element (MCO) 39 reimages the focused beams 41 and 42 reflected from polygon facet 36 onto the photoreceptor (PR) plane 40 at a predetermined position, independently of the polygon angle error or tilt of the current facet 36. The MCO can consist of a toroidal surface in the f-Θ lens, a post-polygon cylinder mirror or a post-polygon cylinder lens. Such compensation is possible because the focused beams are stationary "objects" for the f-Θ lens 37 and the MCO 39. Although, due to polygon tilt, or wobble, the beams 41 and 42 are reflected to different positions of the post-polygon optics aperture for each different facet of the rotating polygon, the beams 41 and 42 are imaged to the same position on the PR plane 40. It should be appreciated that in Prior Art FIG. 10, the chief exit rays from the MCO are not telecentric. That is, the chief exit rays are not parallel with the system axis 38.

Heretofore, a number of patents and publications have disclosed ROS-based recording systems, the relevant portions of which may be briefly summarized as follows:

U.S. Pat. No. 3,750,189 to Fleischer (issued Jul. 31, 1973) discloses a ROS system including a laser whose single-beam, modulated output is collimated and focused onto the facets of a rotating polygon. The reflected beams pass through an fΘ lens lens system and are focused in the scan direction on the surface of a moving photoreceptor. A start-of-scan photosensor is located in the scan plane.

U.S. Pat. No. 4,253,102 to Kataoka et al. (issued Feb. 24, 1981) teaches an optical information recording apparatus employing a semiconductor laser array. The laser array is positioned in an inclined condition so as to reduce the spacing between light spots on the surface of a recording medium.

U.S. Pat. No. 4,390,235 to Minoura (issued Jun. 28, 1983) discloses a multi-beam scanning apparatus for scanning a surface with a plurality of beam spots modulated independently of one another. Included in the system is an anamorphic afocal zoom lens which has the function of changing the angular magnification, resulting in a proportional change in the spot size as well.

U.S. Pat. No. 4,404,571 to Kitamura (issued Sep. 13, 1983) teaches a multi-beam recording apparatus employing a light source with an array of laser light sources that may be inclined with respect to a straight line normal to the optical axis of the system. Also disclosed is a beam detector suitable for the detection of individual beams passing through a screen plate associated therewith.

U.S. Pat. No. 4,474,422 to Kitamura (issued Oct. 2, 1984) discloses a multi-beam optical scanning apparatus employing a collimating portion positioned subsequent to a polygon reflector.

U.S. Pat. No. 5,300,962 to Genovese (issued Apr. 5, 1994) teaches a raster output scanner for multicolor printing wherein adjustment of the relative intensity of sub-beams in a writing beam may be used to control the position of the writing beam on a photoreceptor.

In "Self-Focusing ROS ", Xerox Disclosure Journal, Vol. 18, No. 2, (March/April 1993), pp. 151–52, Robson teaches a single-beam ROS suitable for producing a small spot size that may be adapted for use with microfilm imaging.

The main shortcoming of the systems shown in FIG. 10 and described in the related patents and publications is an inability to produce focused scan lines with sufficient line separation depth of focus to enable the use of two or more lasers, with an interlace of greater than one. This constraint to the use of an interlace of one dictates that these ROS designs will be radiometrically inefficient, since significantly more truncation of the beam is required with an interlace of one than with a higher order interlace.

"Line separation depth of focus" represents the distance along the optical axis over which the line separation is within a specified tolerance of the nominal value. This line separation depth of focus may also vary along the scan line. "Differential bow" is the variation in line separation along the scan line. Thus, differential bow is a special case of line separation, which is the more general imaging parameter. Insufficient line separation depth of focus, and therefore differential bow depth of focus, are primarily attributable to the angular deviation between the chief rays and the system axis between the MCO and the PR image plane. This angular deviation makes it difficult to maintain the line separation and differential bow over a workable depth of focus.

In rotating polygon, multiple spot ROS-based xerographic copiers and printers, it is necessary to accurately maintain the required line separation and to minimize the differential bow. Moreover, it is desirable to maximize the depth of focus for the line separation and the differential bow so as to reduce the critical tolerances for mechanical components within the copier or printer. In a preferred design for a ROS-based system, the system common depth of focus (system common DOF) is maximized, where the system common DOF is characterized as the depth- of-focus over which all performance parameters are met. More specifically, the performance parameters are intended to include at least the following five factors: (1) scan and cross-scan spot size; (2) wobble; (3) differential bow; (4) line separation; and (5) scan linearity. Maximizing the system common DOF means to simultaneously maximize the depth-of-focus for all five listed parameters.

The five performance parameters may be further described as follows:

"Spot size" is typically measured at the Full Width Half Maximum (FWHM) or at the $1/e^2$ point of the Gaussian Beam. The resolution and image processing requirements of the system determine the desired spot size. Assuming that a 600 spot per inch (spi) system is being designed and that the FWHM spot size is to equal the raster spacing, the desired FWHM spot size is: (1 inch/600 spots)(25.4 mm/inch)(1000 µm/1 mm)=42.3 µm round spot Hence, the spots would overlap at the FWHM in both the scan and in the cross-scan directions. Variations in the desired spot size occur depending on whether or not the spot is pulse width modulated. For gray writing, an elliptical (anamorphic) spot may be desired (typically narrower in the scan plane than in the cross scan plane). With specially designed electronics the spot may be controlled by pulse width modulation to the desired size within the raster spacing and thus the desired gray level.

"Wobble" is the unequal spacing of successive scanlines in the process direction at the image plane. Wobble appears to the human eye as banding in a final print. The presence of wobble can be quite disturbing if it occurs within a frequency range over which the eye is most sensitive (typically 0.5 to 2.0 cycles/mm). Therefore, wobble correction is essential over this frequency range in ROS designs. Wobble is directly related to the amount of pyramidal error in the polygon facets. A physical (mechanical) facet tilt of ±0.5 minute (30 arcseconds) produces a ±1 minute (60 arcseconds) of optical tilt.

"Bow" is a measure of the curvature in the cross-scan direction of the scan line from one end of the scan to the other. Bow may be calculated by taking the average of the cross-scan heights at the extreme ends of the scanline then subtracting the cross-scan height at the center of scan. In a multiple diode system, each diode source has its own bow curve. It is the maximum difference in the bow curves between the multiple diodes in a given system that defines the "differential bow". Typically, the bow specification in black-only machines may be quite large, on the order of 150–200 µm. However, the differential bow specification must be held much tighter.

The required "line separation" is dependent on the desired interlace factor. For a scan line interlace factor of 3 for 600 spi raster spacing the line separation is 127 µm.

The optical design must achieve f-Θ correction in the optics to ensure the "scan linearity." Scan linearity is the measure of how equally spaced the spots are written in the scan direction across the entire scanline. Typical scan linearity curves start at zero position error at one end of a scan having a positive lobe of position error, cross the center of scan with zero position error and then have a negative lobe of position error toward the other end of the scan. Scan linearity curves may have image placement errors of zero at several locations across the scanline. Ideally, the curve would be at zero across the entire scanline.

Although a multi-beam, laser diode based ROS is viewed as a most powerful technology for high quality, high throughput xerographic printing, the necessity for high tolerance mechanical, systems to eliminate or control the above effects within the xerographic engine is a barrier to increased speed and reduced cost for such systems. Accordingly, the present invention is directed at a ROS system that not only achieves the desired line separation, enabling higher throughput levels, but does so while maintaining substantial system common depth of focus, thereby reducing the tolerance for other xerographic engine components, such as the photoreceptor and facilitating the alignment process.

In accordance with the present invention, there is provided a multispot optical scanning system for exposing a surface of a photoreceptor, comprising a source of at least two high intensity modulated light beams;

a reflective scanning member, having a light reflective surface thereon, interposed in the optical path between said source and the surface of the photoreceptor;

a pre-scanning optical system for directing the beams to the light reflecting surface of the reflective scanning member, said pre-scanning optical system including a collimator, an aperture, and a cross-scan cylinder lens; and a post-scanning optical system for placing the beams reflected from the light reflecting surface of said reflective scanning member in a path telecentric with an optical axis of the post-scanning optical system prior to striking the surface of the photoreceptor so as to maximize the system common depth of focus about a focal plane defined by the photoreceptor surface, said post-scanning optical system including an f-theta scan lens, and a wobble correcting element.

Figure 1:
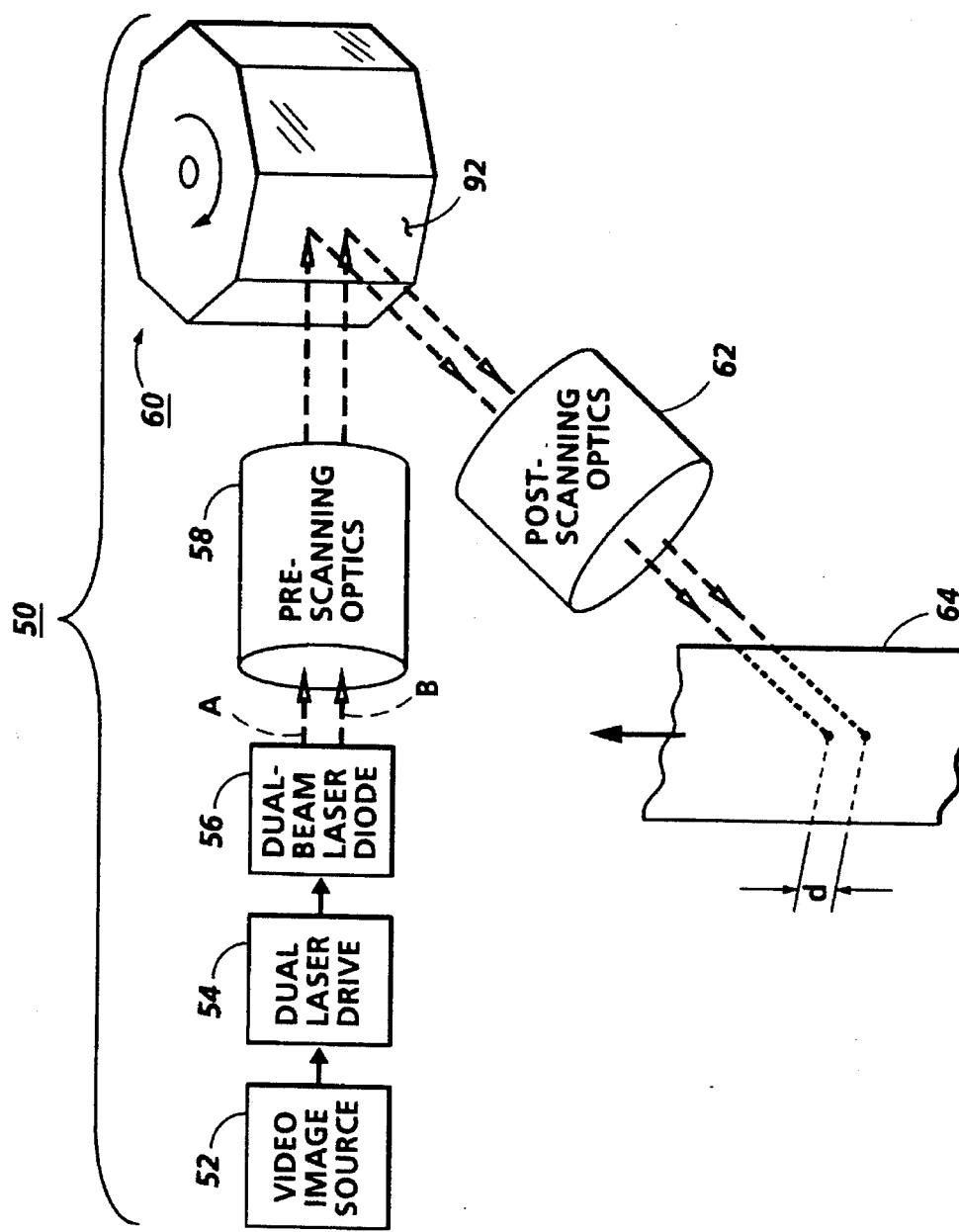
FIG. 1 is a block diagram illustrating a preferred multiple beam ROS embodiment for the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the term pixel will be utilized. The term pixel refers to an optical (or electrical) signal representing the measurable optical properties of a physically definable region on a display medium. A plurality of physically definable regions for either situation represents the physically measurable optical properties of the entire image preferably rendered by a material marking device, or alternatively electrical and magnetic marking devices, or an optical display device.

FIG. 1 is a block diagram illustrating a preferred multiple beam ROS embodiment for the present invention. More specifically, a dual laser diode driver 54 receives input video signals from a video image source 52 such as a raster input scanner (RIS) or similar system suitable for the generation of video signals, including computers, facsimile scanners, and networks. In response to the video signals, the driver causes the modulation of the dual beams (A and B) of multiple laser diode 56. Subsequently, the modulated, dual-beam output of multiple laser diode 56 is shaped by pre-scanning optics 58 before being reflected from a facet of polygon 60. After reflection, the dual-beams are again shaped by post-scanning optics 62 before being scanned across the surface of photoreceptor 64 as a set of beams separated by distance (d).

Table 1 below outlines the general specifications for the telecentric ROS optical system in accordance with the present invention and as depicted in FIGS. 1–7.

TABLE 1

| | |
|---|---|
| RESOLUTION: | 600 spots/inch (spi) |
| SCAN LENGTH: | 12.2 inch (310 mm) |
| NUMBER OF LASERS: | 2 |
| LASER ORIENTATION: | cross scan (sagittal) offset |
| LASER SEPARATION: | 25 μm |
| INTERLACE FACTOR: | 3 |
| SCAN LINE SEPARATION: | 3 × 1/600 inch (127 μm) |
| SCAN LINE SEPARATION TOLERANCE RANGE: | up to ±10.0 μm, and preferably less than ±4.0 μm |

As shown in Table 1, the design specifications for the preferred optical system shown in FIGS. 1–7 require a resolution of 600 pixels per inch, over a scan line of 12.2 inches. Two laser diodes are employed. The laser diodes are vertically aligned into a column, and offset in the cross scan direction (vertically) by 25 μm. The laser beams emitted by the laser diodes are used to form an interlaced image having a scan line interlace factor of 3, where the scan line separation between adjacent scan lines is 127 μm. Alternatively, the scan lines can form consecutive, or in-pitch, scan lines, thus forming a block of text during each scan.

Figure 2:
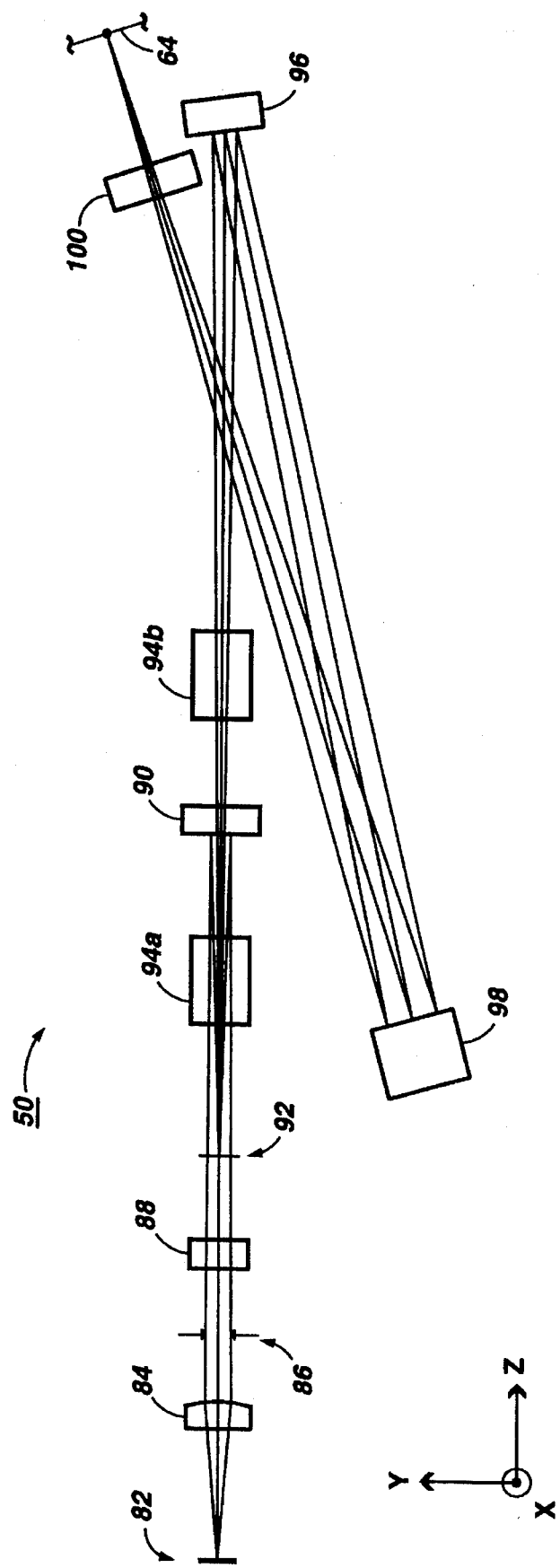
FIG. 2 is a folded cross scan plane view of the elements comprising the present invention.
Figure 3:
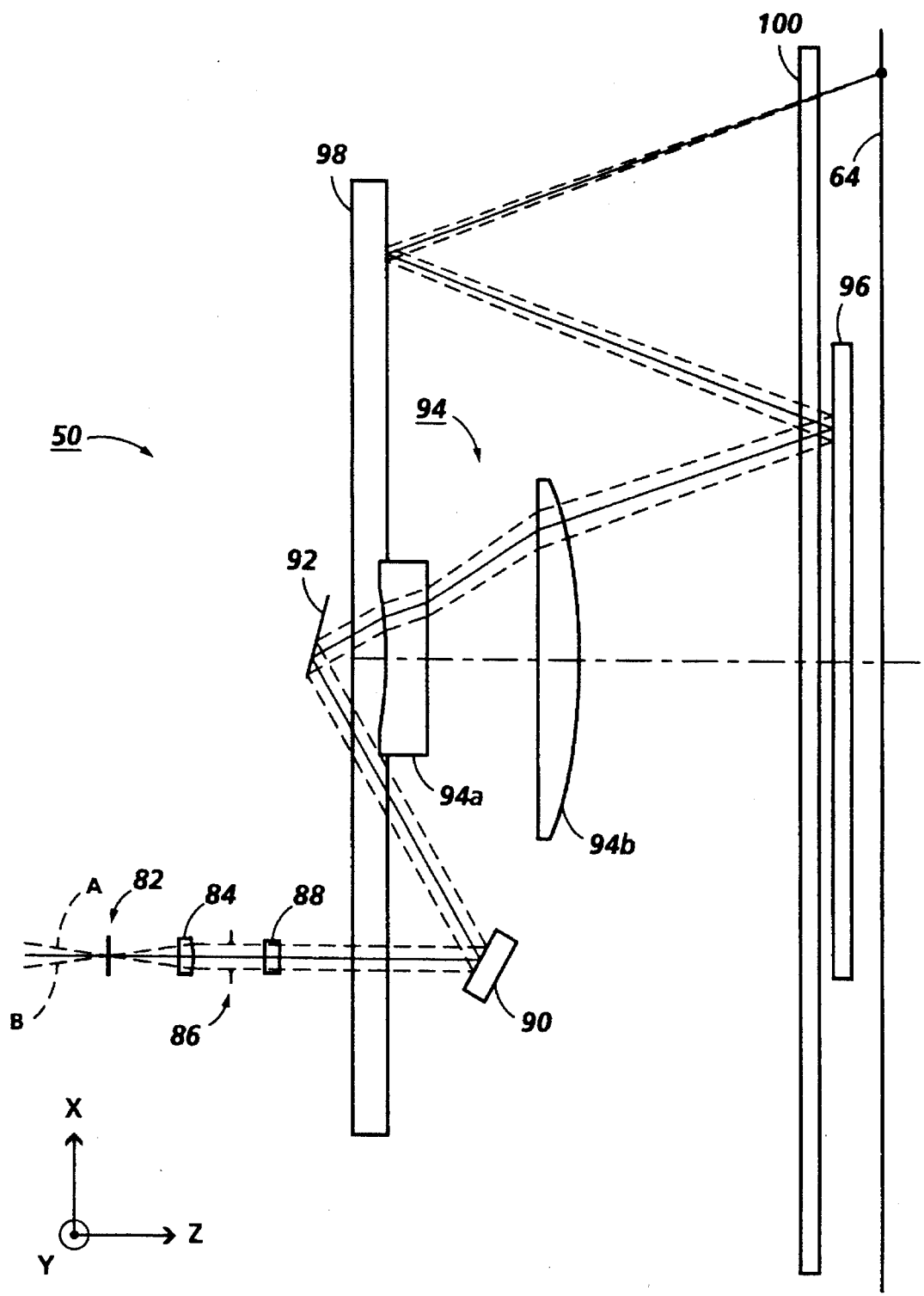
FIG. 3 is a folded scan plane view of the elements comprising the present invention.

FIGS. 2 and 3 illustrate a preferred embodiment forming a general solution for the previously described shortcomings. The cross scan plane and scan plane views of the ROS apparatus 50, respectively illustrated in FIGS. 2 and 3, include a pair of laser diodes (not shown) that emit a pair of light beams A and B through diode window 82. The light beams A and B pass through a collimator 84 and pass through cross scan aperture stop 86. Collimator 84 preferably comprises a single element collimator having one aspheric surface and one spherical surface. Alternatively, collimator 84 may be a multiple element collimator or a gradient index (GRIN) lens. The light beams then continue through a single element cross-scan cylinder lens 88 which focuses them in the cross-scan direction onto the polygon facet surface 92 of the underfilled polygon 60 (FIG. 1) after being reflected off of a first fold mirror 90. After being reflected and scanned by the polygon facet surface 92, the light beams A and B pass through the f-Θ (f-theta) scan lens 94. The f-Θ scan lens is preferably a two-element lens, as depicted in FIG. 3, comprising a first scan lens 94a and a second scan lens 94b. Details of the f-Θ scan lens as well as other elements of the optical system are included in Table 2. Alternatively, the f-Θ (theta) scan lens 94 may be a single aspheric toroid lens.

Figure 8:
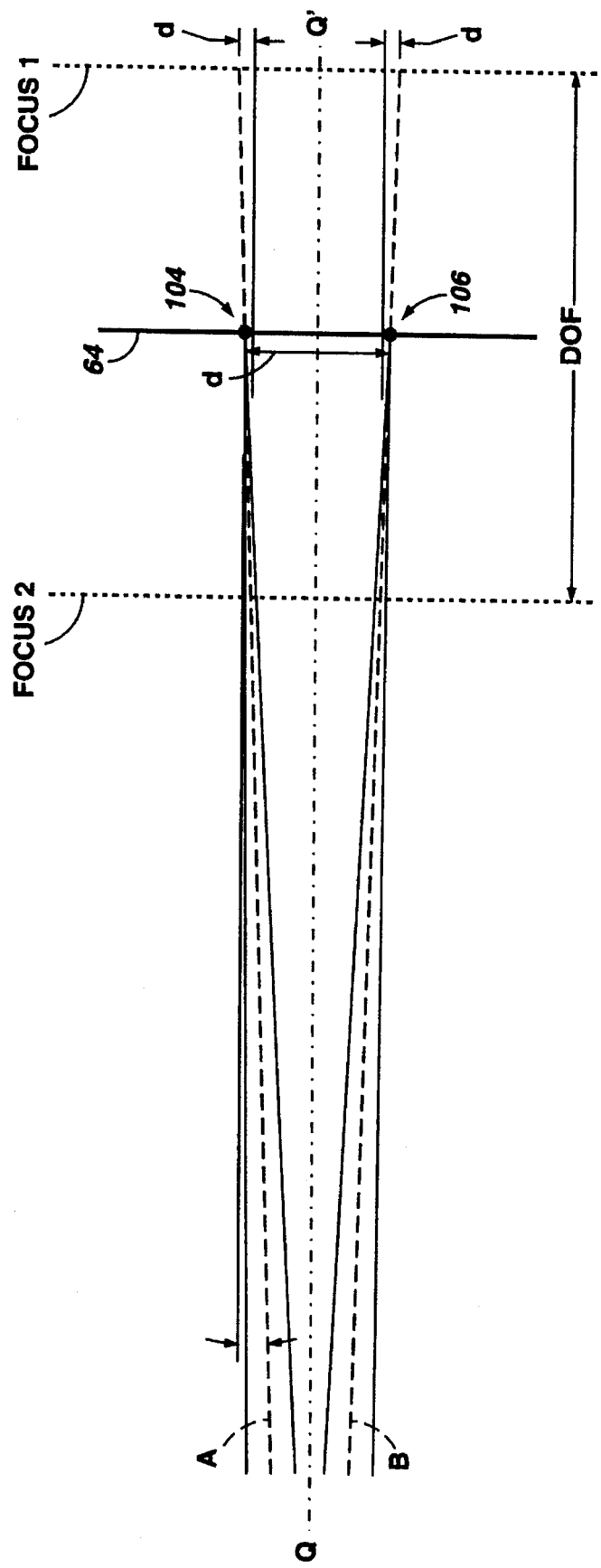
FIG. 8 is a detailed view of the line separation and depth of focus available as a result of the present invention in the area near the photoreceptor plane.

After the f-Θ lens, the light beams A and B are reflected by a second fold mirror 96, and then reflected by a cylinder mirror 98 prior to passing through exit window 100. Once through exit window 100, the light beams impinge upon photoreceptor surface 64 forming two spots, respectively 104 and 106, as illustrated in FIG. 8. The two spots each

TABLE 2

| | Description of Optical Elements | | | |
|---|---|---|---|---|
| | | Glass | Surface Types | |
| Comment | Element | Type | Surface 1 | Surface 2 |
| flat window which comes in diode | Diode Window | FK5 | plano | plano |
| collimator element | Aspherical Lens | PSK50 | spherical | aspherical |
| rectangular | Aperture Stop | N/A | N/A | N/A |
| pre-polygon cylinder lens | Cylinder Lens | BK7 | cross scan plane cylinder | plano |
| fΘ lens 1 | Scan Lens #1 | PBH10 | scan plane cylinder | cross scan plane cylinder |
| fΘ lens 2 | Scan Lens #2 | PBH10 | cross scan plane cylinder | spherical |
| 5.5 degree included angle | Cylinder Mirror | BK7 | cross scan plane cylinder | N/A |
| 1 degree tilt | Exit Window | BK7 | plano | plano | produce a scan line of at least 12 inches (i.e., at least a page width) when scanned across the photoreceptor surface 64 by the rotating polygon.

Figure 4:
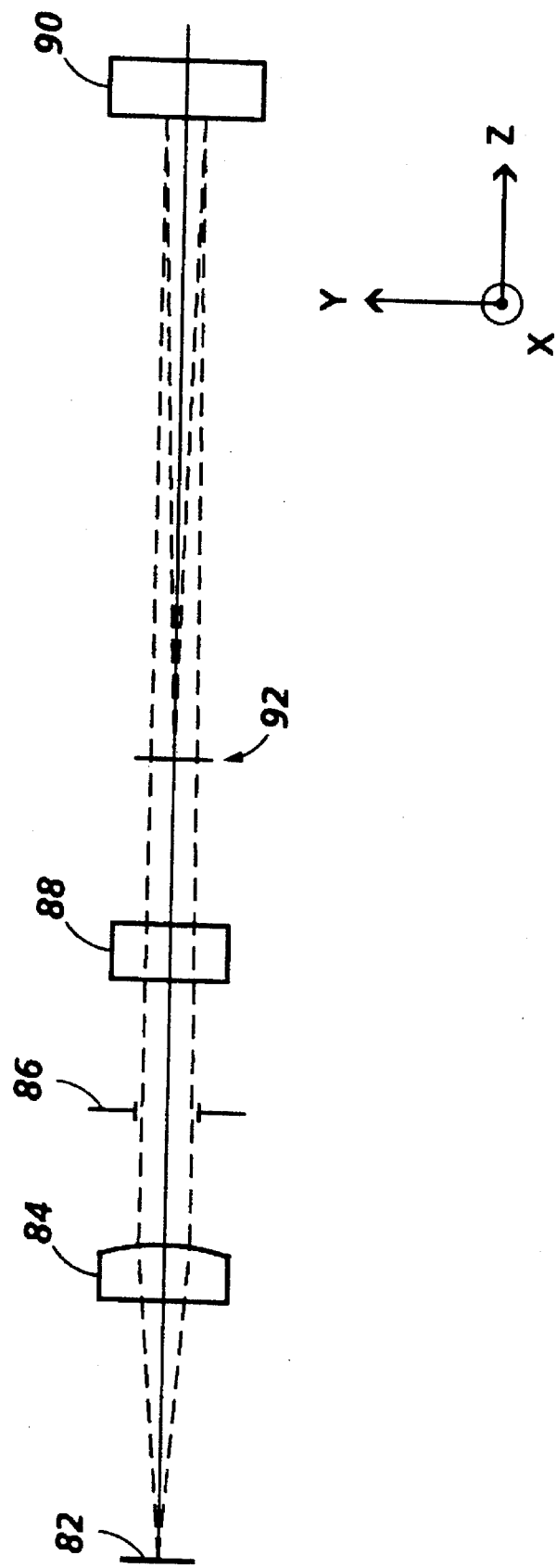
FIG. 4 is a detailed cross scan plane view of the pre-scanning ROS elements of FIG. 1.
Figure 5:
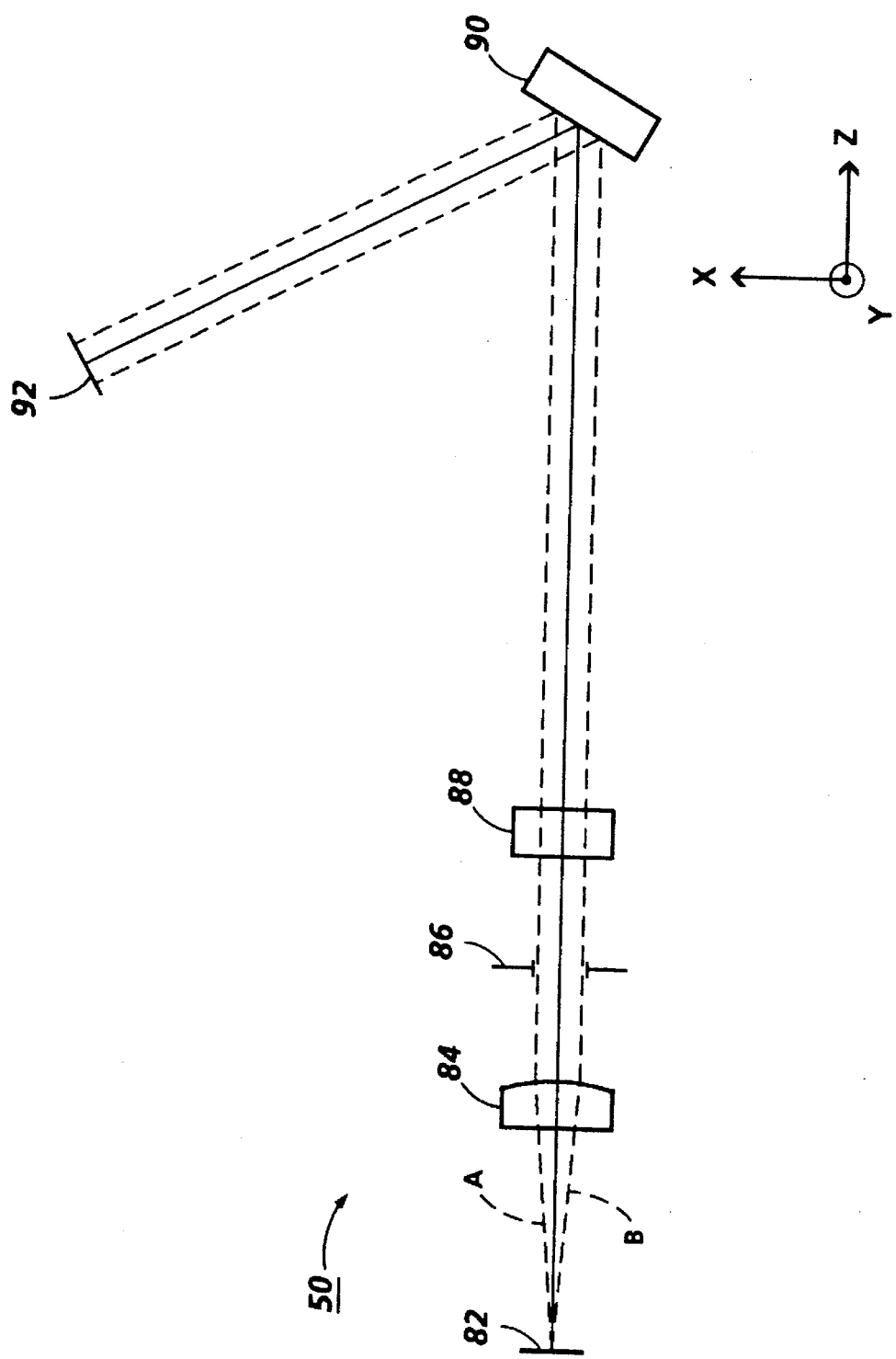
FIG. 5 is a detailed scan plane view of the pre-scanning ROS elements of FIG. 1.

Referring now to FIGS. 4 and 5, the details of the pre-scanning optical system, optics system 58 of FIG. 1, will be described in further detail. Although not shown in FIGS. 4 or 5, the dual beams A and B are preferably generated by a dual diode laser or any equivalent device having a flat diode window 82. The dual diodes are separated by a distance of approximately 25 μm, and are oriented in the optical system so that they are offset in the cross scan direction. Once the beams are transmitted through window 82, they are next operated on by aspherical lens 84, which serves to collimate the beams. Lens 84 preferably exhibits a spherical shape on the diode side and an aspherical shape on the facet side thereof. In a preferred embodiment, the aspherical lens may be formed of PSK50 glass as indicated in Table 2.

Once transmitted through the aspherical collimating lens 84, the beams are then passed through an aperture or rectangular stop 86, where a portion of the beam intensity may be attenuated. The major axis of the rectangle is in the scan plane and the minor axis of the rectangle is in the cross-scan plane. Beams A and B are then operated on by cylinder lens 88. Cylinder lens 88 preferably includes a first surface which may be characterized as forming a cross scan plane cylinder, and a second or output-side surface that is planar. The focal length and position of the cylinder lens serves to focus the beams in the cross scan plane plane at the facet surface 92. The beams remain collimated in the scan plane plane at the facet.

Having been focused in the cross scan plane plane by cylinder lens 88, the beams are then reflected off the planar surface of the first fold mirror 90, in the direction of the facet 92. Fold mirror 90 is positioned at a 60° included reflected angle in the folded optics system illustrated for the preferred embodiment. Having traversed the elements of the pre-scanning optical system, the beams reflected off of first fold mirror 92 are then reflected by the surface of polygon 60 in FIG. 1, illustrated in FIGS. 4 and 5 as facet 92. In a preferred embodiment, polygon 60 may be characterized as an underfilled, 8 facet design.

It should be appreciated that the reflecting surface need not be a rotating polygon facet. The surface can also be a reflecting surface associated with a galvanometer, a holographic scanner or a micromodulator as are well-known in the art. The rotating polygon may have any number of facets, from one to as many as necessary to obtain the desired system characteristics. Further, the reflecting surface, whether a rotating polygon, a micromodulator, or any other known type of scanning mechanism, can be of a type that is underfilled by the light beams, or overfilled by the light beams, or critically filled. In addition, although not illustrated, an enclosure with a window or similar means for preventing contamination of the facet surface(s) may be employed to isolate the reflecting surface(s).

Figure 6:
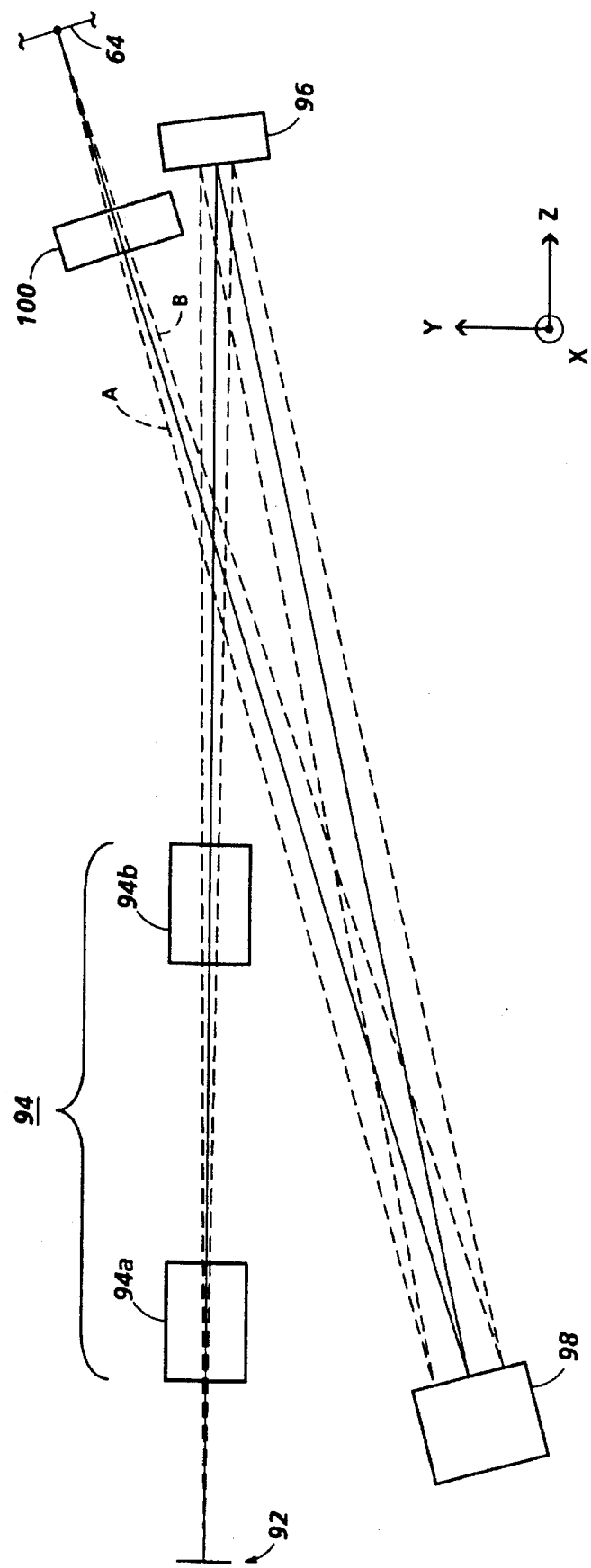
FIG. 6 is a detailed cross scan plane view of the post-scanning ROS elements of FIG. 1.
Figure 7:
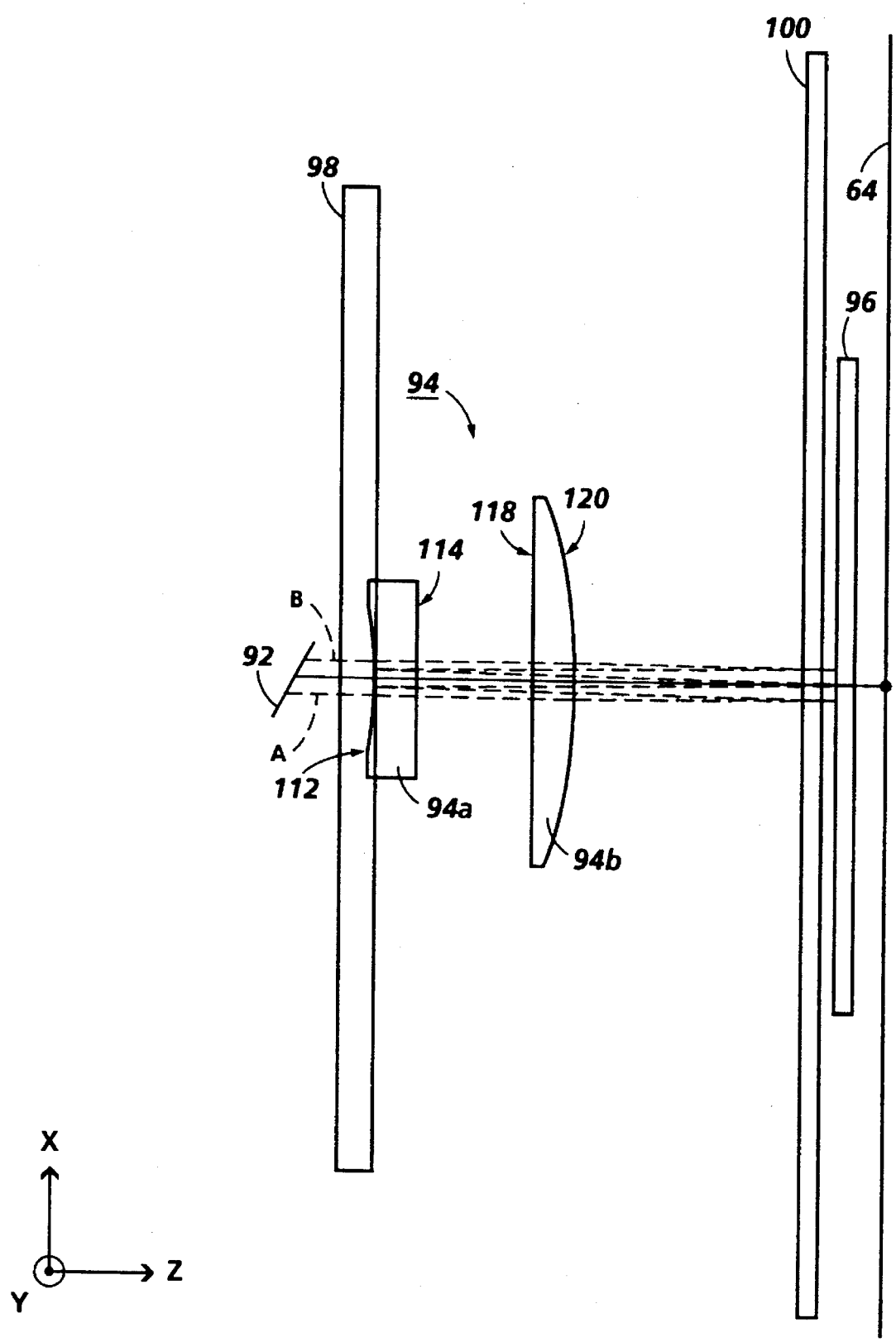
FIG. 7 is a detailed scan plane view of the post-scanning ROS elements of FIG. 1.

Turning now to FIGS. 6 and 7, in conjunction with Table 2, the details of the post-scanning optics system will be described. Specifically, the f-Θ scan lens 94 is comprised of two elements, a first scan lens 94a and a second scan lens 94b. First scan lens 94a has scan plane cylindrical power on surface 112 which faces the polygon facet, and cross scan cylindrical power on the opposite surface, 114. Second scan lens 94b of the f-Θ lens has cross scan cylindrical power on surface 118 and spherical power on surface 120. The chief rays for each of the beams, A and B, are illustrated in their respective positions as they pass through the two elements of f-Θ lens 94.

Subsequently, the beams are reflected by a second fold mirror 96 which is angled at approximately 6.25 degrees to the cross scan axis so as to direct the beams to the reflecting surface of cylinder mirror 98 at an included angle of 12.5 degrees. Cylinder mirror 98 is angled at 2.75 degrees with respect to the optical axis, yielding an included angle of 5.5 degrees, and directs the beams toward exit window 100 upon reflection therefrom. The sole purpose of exit window 100 is to isolate the optical system 50 from the remainder of the xerographic engine, keeping dirt out of the ROS optical subsystem. After passing through exit window 100, the beams impinge upon the surface of photoreceptor 64 to form a pair of parallel lines as they are scanned across the surface.

It should be noted that while illustrated as a dual-beam ROS for simplicity, optical system 50 is equally applicable to systems having three or more laser diodes and laser beams. It should also be noted that in the case of an odd number of lasers, the chief ray of the center laser would be located on the cross scan optical axis.

It should further be appreciated that each laser diode 81 and 82 can each emit its light beam at a wavelength different from the wavelength of the light beam emitted by the other laser diode. Finally, the system is not limited to laser diodes. Any known light emitting device, such as any solid state laser, gas laser, liquid laser or semiconductor laser can be used. Further, a light emitting diode or the like may be used, so long as the emitted light beam can be modulated (either as it is output, or by a micromodulator-type scanner). Thus, a flash lamp or the like could also be used as the light source.

As illustrated in detail in FIG. 8, after being reflected by cylinder mirror 98, the laser beams A and B are focused onto the plane of photoreceptor 64 to form scanning spots 104 and 106. Most importantly the chief exit rays of the laser beams A and B are essentially parallel to the system optical axis Q-Q'. That is, the chief exit rays are generally telecentric wherein they each impinge upon the surface at an angle of incidence of approximately 0.22 degrees or less.

Figure 9:
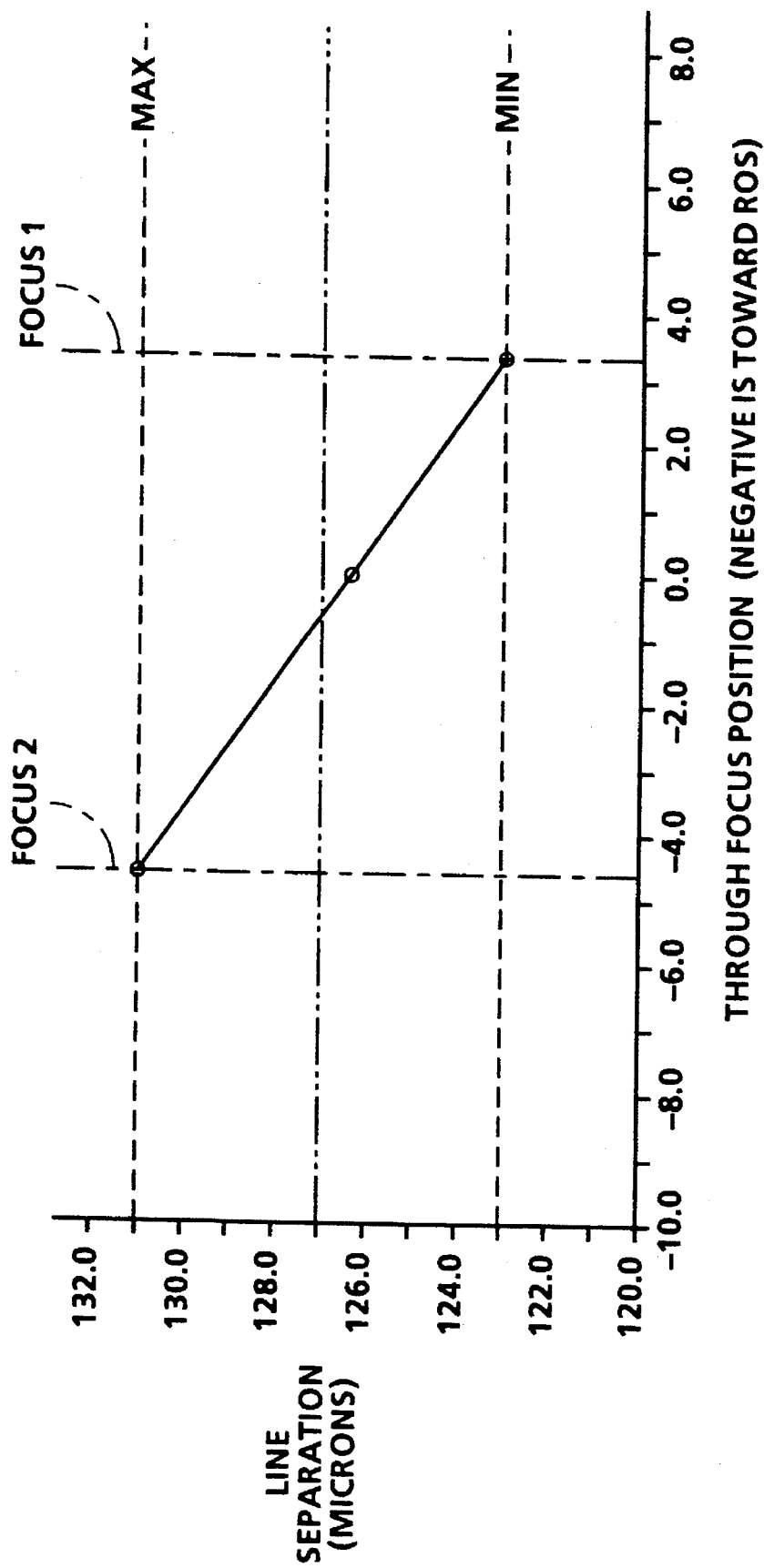
FIG. 9 is a graphical illustration of the relationship of line separation versus depth of focus for a preferred embodiment of the present invention.
Figure 10:
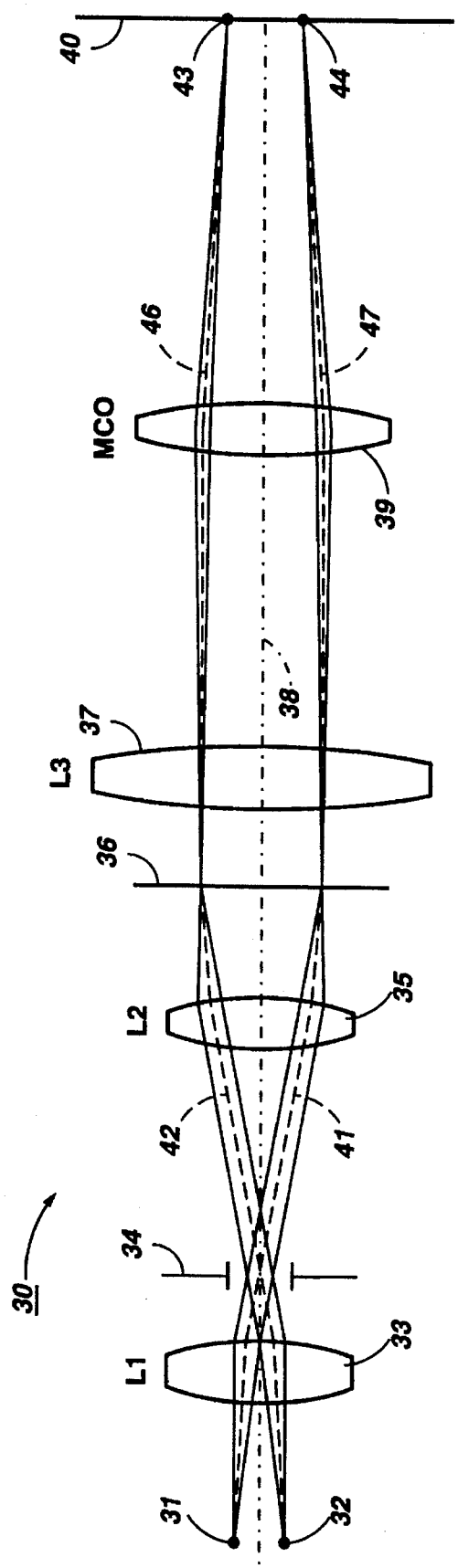
FIG. 10 shows the sagittal block diagram of a typical prior art polygon optical system.

Finally, FIG. 9 is an illustration of the line separation versus the focal position. From this graph one can calculate the line separation depth of focus (DOF) for any given line separation tolerance specification. For example the line separation DOF for a line separation specification of 127.0±4.0 μm is 7.966 mm (from −4.616 mm to 3.350 mm). Table 3 shows the approximate line separation DOF's for several line separation tolerance (Δd) requirements. With such a large depth of focus, while maintaining the necessary line separation, the present invention provides significant latitude (at least 995×Δd) in mechanical tolerances for, for example, the photoreceptor and its associated drive mechanisms.

In recapitulation, the present invention is a method and apparatus for maintaining the line separation of a multispot ROS while maximizing the system common depth of focus. In the preferred design for a ROS-based system, the system common depth of focus (system common DOF) is maximized, where the system common DOF is characterized as the depth-of-focus over which all performance parameters are met. The optical system design of the present invention maximizes the system common DOF while obtaining a line separation of 127 microns. The importance of the present invention increases as the tolerance on the line separation specification decreases for high quality printing. When the tolerance is large, the resultant line separation DOF is typically acceptable from any good multiple diode design.

TABLE 3

| TOLERANCE (Δd) ON LINE SEPARATION SPECIFICATION Nominal = 127.0 μm (μm) | APPROXIMATE LINE SEPARATION DOF (mm) |
| --- | --- |
| ±1.0 | 1.992 |
| ±2.0 | 3.98 |
| ±3.0 | 5.975 |
| ±4.0 | 7.966 |
| ±5.0 | 9.958 |
| ±6.0 | 11.949 |
| ±7.0 | 13.941 |
| ±8.0 | 15.933 |
| ±9.0 | 17.924 |
| ±10.0 | 19.916 |

It is, therefore, apparent that there has been provided, in accordance with the present invention, a method and apparatus for improving the depth of focus in a raster output scanner. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A multispot optical scanning system for exposing a surface of a photoreceptor, comprising:
   a source of at least two high intensity modulated light beams;
   a reflective scanning member, having a light reflective surface thereon, interposed in the optical path between said source and the surface of the photoreceptor;
   a pre-scanning optical system for directing the beams to the light reflecting surface of the reflective scanning member, said pre-scanning optical system including
   a collimator,
   an aperture, and
   a cross-scan cylinder lens; and
   a post-scanning optical system for placing the beams reflected from the light reflecting surface of said reflective scanning member in a path telecentric with an optical axis of the post-scanning optical system prior to striking the surface of the photoreceptor so as to maximize the system common depth of focus about a focal plane defined by the photoreceptor surface wherein the multispot optical scanning system exposes the photoreceptor surface with the at least two high intensity beams having an interlace factor greater than one, said post-scanning optical system including
   an f-theta scan lens, and
   a wobble correcting element.

2. The system of claim 1, wherein said collimator is a single element collimator, said single element collimator including:
   an aspheric surface; and
   a spherical surface.

3. The system of claim 2, wherein said aspheric surface is found on a side facing the reflective scanning member, and said spherical surface is found on a side facing the modulated light beam source.

4. The system of claim 1, wherein at least two of said plurality of light beams continuously impinge upon the light sensitive medium at an angle of incidence less than 0.22 degrees.

5. The system of claim 1, wherein said pre-scanning optical system is a folded system and further includes at least one fold mirror.

6. The system of claim 1, wherein said reflective scanning member comprises a rotating polygon.

7. The system of claim 1, wherein said reflective scanning member is a micromodulator.

8. The system of claim 1, wherein said collimator comprises a GRIN lens.

9. The system of claim 1, wherein said collimator comprises a multiple element collimator.

10. The system of claim 1, wherein said cross-scan cylinder lens comprises a multiple element lens.

11. The system of claim 1, wherein said f-theta scan lens comprises a dual element lens.

12. The system of claim 1, wherein said f-theta scan lens comprises a single aspheric toroid lens.

13. The system of claim 1, wherein said wobble correcting element is selected from the group consisting of:
   a cylinder mirror;
   a cylinder lens; and
   a toroid lens.

14. The system of claim 1, further comprising a scanning window for preventing contamination of said reflective scanning member.

15. The system of claim 1, further comprising an exit window positioned in proximity to the surface of the photoreceptor for preventing the contamination of the optical scanning system.

16. The system of claim 1, wherein the interlace factor is equal to three.

17. A multispot optical scanning system for exposing a surface of a photoreceptor, comprising:
   a source of at least two high intensity modulated light beams;
   a reflective scanning member, having a light reflective surface thereon, interposed in the optical path between said source and the surface of the photoreceptor;
   a pre-scanning optical system for directing the beams to the light reflecting surface of the reflective scanning member, said pre-scanning optical system including
   a single element collimator, comprising an aspheric surface and a spherical surface,
   an aperture, and
   a cross-scan cylinder lens; and
   a post-scanning optical system for placing the beams reflected from the light reflecting surface of said reflective scanning member in a path telecentric with an optical axis of the post-scanning optical system prior to striking the surface of the photoreceptor so as to maximize the system common depth of focus about a focal plane defined by the photoreceptor surface, said post-scanning optical system including
   an f-theta scan lens, wherein said f-theta scan lens is a dual element lens, and where
   the first element of said dual element f-theta lens has a scan plane cylindrical power on a first surface facing said reflecting scanning member and a cross scan cylindrical power on an opposite surface, and
   the second element of said dual element f-theta lens has cross scan cylindrical power on a first surface facing said reflecting scanning member and spherical power on an opposite surface, and
   a wobble correcting element.

18. A multispot optical scanning system for exposing a surface of a photoreceptor, comprising:
   a source of a plurality of high intensity modulated light beams, wherein at least two of said plurality of light beams are separated by a distance d within a tolerance $\Delta d$ at the focal plane and where the depth of focus of the light beams is at least 995 times the distance tolerance $\Delta d$;
   a reflective scanning member, having a light reflective surface thereon, interposed in the optical path between said source and the surface of the photoreceptor;
   a pre-scanning optical system for directing the beams to the light reflecting surface of the reflective scanning member, said pre-scanning optical system including
   a collimator,
   an aperture, and
   a cross-scan cylinder lens; and
   a post-scanning optical system for placing the beams reflected from the light reflecting surface of said reflective scanning member in a path telecentric with an optical axis of the post-scanning optical system prior to striking the surface of the photoreceptor so as to maximize the system common depth of focus about a focal plane defined by the photoreceptor surface, said post-scanning optical system including
   an f-theta scan lens, and
   a wobble correcting element.

19. The system of claim 18, wherein the light beam separation distance d is at least 127 microns at the surface of the photoreceptor.

20. The system of claim 19, wherein the light beams are maintained in focus over a depth of focus of at least 7.966 millimeters about a focal plane defined by a nominal position of the surface of the photoreceptor.

21. A multispot optical scanning system for exposing a surface of a photoreceptor, comprising:

a source of at least two high intensity modulated light beams wherein said source comprises a pair of laser diodes that are offset in the cross scan plane by 25 microns;

a reflective scanning member, having a light reflective surface thereon, interposed in the optical path between said source and the surface of the photoreceptor;

a pre-scanning optical system for directing the beams to the light reflecting surface of the reflective scanning member, said pre-scanning optical system including
a collimator,
an aperture, and
a cross-scan cylinder lens; and a post-scanning optical system for placing the beams reflected from the light reflecting surface of said reflective scanning member in a path telecentric with an optical axis of the post-scanning optical system prior to striking the surface of the photoreceptor so as to maximize the system common depth of focus about a focal plane defined by the photoreceptor surface, said post-scanning optical system including
an f-theta scan lens; and
a wobble correcting element.

22. The system of claim 21, wherein said post-scanning optical system is a folded system and further includes at least one fold mirror.

23. The system of claim 22, wherein said reflective scanning member is a rotating polygon, said rotating polygon including eight reflective facets spaced about a periphery thereof.

* * * * *